United States Patent
Timonov et al.

(10) Patent No.: US 7,563,354 B2
(45) Date of Patent: Jul. 21, 2009

(54) METHOD FOR THE MANUFACTURE OF ELECTRODE FOR ENERGY-STORAGE DEVICES

(75) Inventors: Alexander Mikhailovich Timonov, St. Petersburg (RU); Sergey Anatolijevich Logvinov, St. Petersburg (RU); Dmitriy Ivanovich Pivunov, St. Petersburg (RU); Svetlana Viktorovna Vasiljeva, St. Petersburg (RU); Nik Shkolnik, West Hartford, CT (US); Sam Kogan, Newton Center, MA (US)

(73) Assignee: GEN3 Partners, Inc., Boston, MA (US)

( * ) Notice: Subject to any disclaimer, the term of this patent is extended or adjusted under 35 U.S.C. 154(b) by 357 days.

(21) Appl. No.: 11/088,509

(22) Filed: Mar. 24, 2005

(65) Prior Publication Data

US 2005/0217998 A1    Oct. 6, 2005

Related U.S. Application Data

(63) Continuation of application No. PCT/US03/29363, filed on Sep. 15, 2003.

(60) Provisional application No. 60/413,383, filed on Sep. 25, 2002.

(51) Int. Cl.
 *C25D 9/00* (2006.01)
(52) U.S. Cl. ............... 205/316; 205/106; 205/107; 205/108; 205/198; 205/317
(58) Field of Classification Search .......... 205/198, 205/106, 107, 108, 317, 316
See application file for complete search history.

(56) References Cited

U.S. PATENT DOCUMENTS 3,962,250 A * 6/1976 Neri et al. .............. 546/10

(Continued)

FOREIGN PATENT DOCUMENTS

JP    60-180064    9/1985

(Continued)

OTHER PUBLICATIONS

Bedioui ("Electrooxidative Polymerization of Cobalt, Nickel and Manganese Salen Complexes in Acetonitrile Solution", J. Electroanalytical Chem., vol. 301 (1991), pp. 267-274).*

(Continued)

*Primary Examiner*—Harry Wilkins
*Assistant Examiner*—Zulmariam Mendez
(74) *Attorney, Agent, or Firm*—K&L Gates

(57) ABSTRACT

Application of a redox polymer of the poly-[Me(R-Salen)] type onto a conducting substrate is accomplished by the method of electrochemical polymerization. Said polymerization is accomplished by supplying a voltage between the substrate (that serves as an anode) and a counter electrode (that serves as a cathode), with both of them being submerged into the electrolyte containing an organic solvent and the compounds capable of dissolving in said solvent. The process is accompanied by the production of electrochemically inactive (at concentrations of no less than 0.01 mol/l) ions within the range of potentials from −3.0 V to +1.5 V, and metal complex [Me(R-Salen)] dissolved at a concentration of no less than $5 \cdot 10^{-5}$ mol/l, (where: Me is a transition metal having at least two different degrees of oxidation, R is an electron-donating substituent, Salen is a residue of bis-(salicylaldehyde)-ethylenediamine in Schiff's base.

20 Claims, 3 Drawing Sheets

U.S. PATENT DOCUMENTS

| | | | |
|---|---|---|---|
| 4,535,039 | A | 8/1985 | Naarmann et al. |
| 4,609,600 | A | 9/1986 | Heinze et al. |
| 4,666,567 | A * | 5/1987 | Loch .......................... 205/83 |
| 4,695,358 | A * | 9/1987 | Mizuno et al. .............. 204/174 |
| 4,999,263 | A | 3/1991 | Kabata et al. |
| 5,543,326 | A | 8/1996 | Heller et al. |
| 5,729,427 | A | 3/1998 | Li et al. |
| 5,840,443 | A | 11/1998 | Gregg et al. |
| 6,323,309 | B1 | 11/2001 | Swager et al. |
| 6,533,918 | B2 | 3/2003 | Roitman et al. |
| 6,795,293 | B2 | 9/2004 | Timonov et al. |
| 6,802,951 | B2 * | 10/2004 | Hossick-Schott .......... 205/108 |
| 7,292,431 | B2 | 11/2007 | Timonov et al. |
| 2002/0089807 | A1 | 7/2002 | Bluvstein et al. |
| 2005/0258042 | A1 | 11/2005 | Lyubomirskiy et al. |
| 2007/0234537 | A1 | 10/2007 | Chepurnaya et al. |

FOREIGN PATENT DOCUMENTS

| | | |
|---|---|---|
| JP | 61-030689 | 2/1986 |
| JP | 07-331491 | 12/1995 |
| WO | WO 03065536 A2 | 8/2003 |

OTHER PUBLICATIONS

Jerry L. Reddinger, et al., "Tunable Redox and Optical Properties Using Transition Metal-Complexed Polythiophenes", 1997 American Chemical Society, pp. 673-675, XP 000678019.

Jerry L. Reddinger, et al., "Site Specific Electropolymerization to Form Transition-Metal-Containing, Electroactive Polythiophenes", 1998 American Chemical Society, pp. 1236-1243, XP009024632.

Jerry L. Reddinger, et al., "A Novel Polymeric Metallomacrocycle Sensor Capable of Dual-Ion Cocomplexation", 1998 American Chemical Society, pp. 3-5, XP009024677.

A. Alatorre Ordaz, et al., "Electrocatalysis of the reduction of organic halide derivatives at modified electrodes coated by cobalt and iron macrocyclic complex-based films: application to the electrochemical determination of pollutants", EDP Sciences, Wiley-VCH 2000, pp. 238-244, XP009024693.

Lisa A. Hoferkamp, et al., "Surface-Modified Electrodes Based on Nickel (II) and Copper (II) Bis(salicylaldimine) Complexes", 1989 American Chemical Society, pp. 348-352, XP009024771.

Fethi Bedioui, et al., "Electrooxidative polymerization of cobalt, nickel and manganese salen complexes in acetonitrile solution", 1991-Elsevier Sequoia S.A., pp. 267-274, XP009024767.

P. Audebert, et al., "Redox and Conducting Polymers Based on Salen-Type Metal Units; Electrochemical Study and Some Characteristics", New Journal of Chemistry, vol. 16, 1992, pp. 697-703, XP001179208.

Colin P. Horwitz, et al., "Oxidative Electropolymerization of Metal Schiff-Base Complexes", Mol. Cryst. Liq. Cryst., 1988, vol. 160, pp. 389-404, XP009024770.

Magda Martins, et al., "Ni(Salen)-based Polymer Modified Electrodes as Sensors for Metal Ions", Electrochemical Society Proceedings, vol. 2001-18, pp. 399-407, XP009024792.

Timonov, A.M., Shagisultanova, G.A., Polymeric Partially-Oxidized Complexes of Nickel, Palladium and Platinum with SchiffBases// Workshop on Platinum Chemistry. Fundamental and Applied Aspects. Italy, Ferrara, 1991. p. 28.

G.A. Shagisultanova, Timonov, A.M., Synthesis and Properties of Polymeric partially Oxidized Complexes of Nickel, Palladium, and Platinum with Tetradentate Schiff Bases, 1991 Plenum Publishing Corporation, pp. 286-293.

Mao, et al., Electrochemical Nitric Oxide Sensors Based in Electropolymerized Film of M(salen) with Central Ions of Fe, Co, Cu and Mn, Electroanalysis 2000, 12, No. 1, pp. 72-77 (2000).

Liu, et al., Electro-Catalytic Oxidation of Ascorbic Acid at a Cobalt-Salen Polymer Modified Electrode and Analytical Applications, Analytical Letters, 33(2), pp. 175-192 (2000).

Cassidy, H. G., et al., Oxidation-Reduction Polymers, Chapter 1: Overall View of the Field of Oxidation-Reduction Polymers, 1965, pp. 1-11, Wiley Interscience, New York.

H.C. Hurrell, et al., Redox Conduction in Electropolymerized Films of Transition-Metal Complexes of Os, Ru, Fe, and Co, 1990, vol. 29, pp. 736-741, Inorg. Chem.

Timonov A.M., Shagisultanova, G.A., Polymeric Partially-Oxidized Complexes of Nickel, Palladium and Platinum with Schiff Bases// Workshop on Platinum Chemistry. Fundamental and Applied Aspects. Italy, Ferrara, 1991. p. 28.

Charge Transfer in Polymeric Systems//Faraday Discussions of the Chemical Society. 1989. V. 88.

Lanquin Mao, et al, "A New Ultramicrosensor for Nitric Oxide Based On Electropolymerized Film of Nickel Salen," Analytical Letters, 31(12), pp. 1991-2007 (1998), XP009026797.

B.E. Conway, Electrochemical Supercapacitors, Kluwer Acad. Publ. NY 199, Chapter 12.

P. Audebert et al. "Electrochemical Polymerization of Several Salen-type complexes. Kinetic Studies in the Microsecond the range." J.Electroanalysis Chem. 338 (1992) pp. 269-278 xP009026799.

* cited by examiner

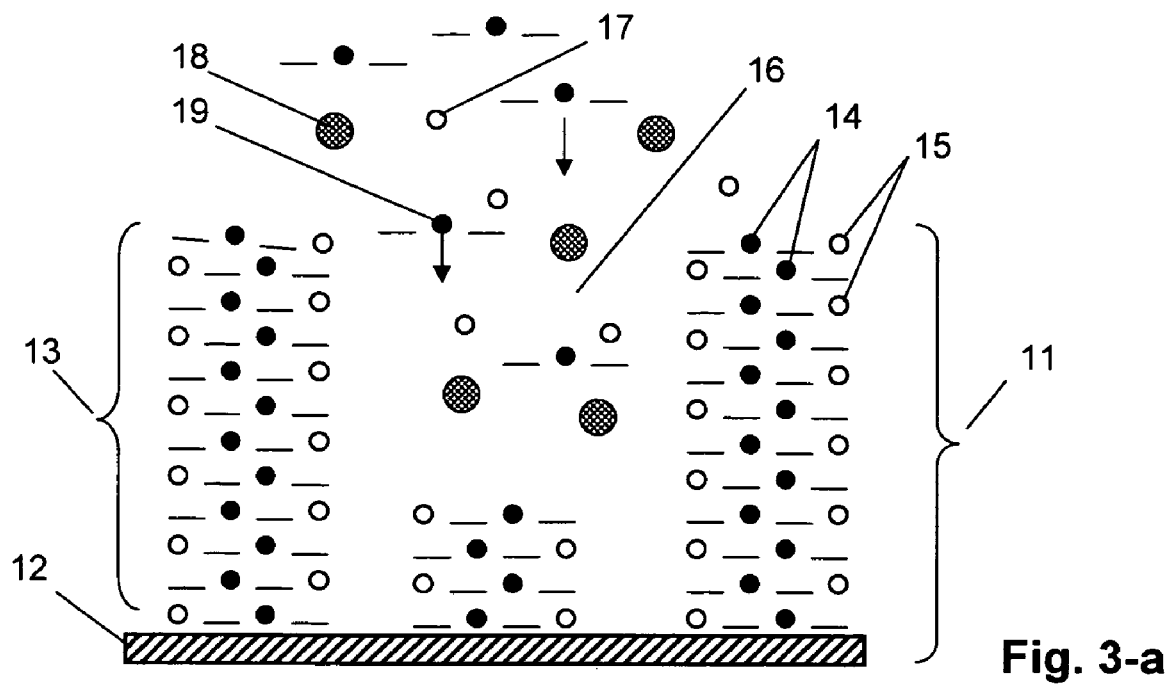
Fig. 3-a
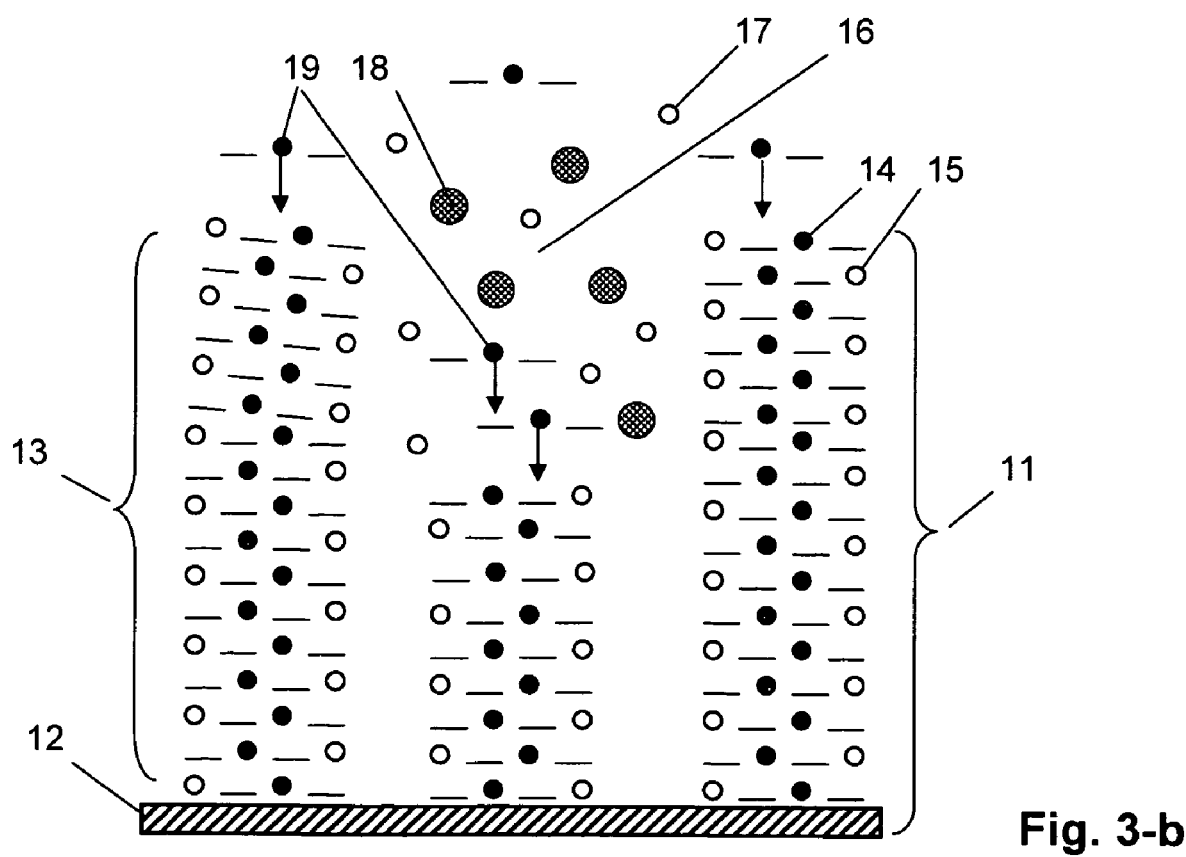
Fig. 3-b

METHOD FOR THE MANUFACTURE OF ELECTRODE FOR ENERGY-STORAGE DEVICES

RELATED APPLICATIONS

This application is a Continuation of PCT application serial number PCT/US03/29363 filed on Sep. 15, 2003 which claims the benefit of provisional application Ser. No. 60/413,383 filed on Sep. 25, 2002 both of which are incorporated herein by reference in their entirety.

FIELD OF THE INVENTION

The invention relates to the field of electrochemistry. More specifically, the invention relates to the methods of manufacture of electrodes chemically modified by a redox polymer intended for use in energy-storage devices (e.g. capacitors).

BACKGROUND OF THE INVENTION

The known methods of manufacturing of electrodes with a polymer coating are mainly based on the chemical polymerization method, such as the ones described in U.S. Pat. Nos. 4,999,263, 6,533,918, U.S. patent application No. 20020089807A1, which implies the formation of a polymer layer on a conducting substrate placed into an electrolytic bath with electrolyte-containing polymer compounds. Different polymer coatings are formed on the conducting substrate depending on the electrolytes used for this purpose.

Both purely organic systems and polymer metal complexes (or organometallic compounds) fall into the category of the redox polymers [H. G. Cassidy and K. A. Kun. Oxidation Reduction Polymer//Redox Polymers. Wiley—Interscience, New York, 1965]. Polymers that contain a metal usually offer better conductivity.

Redox polymers produced from the octahedral source complex compounds are known. Polypyridine complexes of the composition poly-[Me(v-bpy)x(L)y], where: Me=Co, Fe, Ru, Os; L=v-bpy (4-vinyl-4'-methyl-2,2'-bipyridine), phenanthroline-5,6-dione, 4-methylphenanthroline, 5-aminophenanthroline, 5-chlorophenanthroline (x+y=3) [Hurrel H. C., Abruna H. D. Redox Conduction in Electropolymerized Films of Transition Metal Complexes of Os, Ru, Fe, and Co//Inorganic Chemistry. 1990. V. 29. P. 736-741], as well as porphyrin and phthalocianine metal complexes and electrodes modified by these complexes [U.S. Pat. Nos. 5,729,427, 5,840,443] may serve as examples of such redox polymers. However, the above-named polymers are characterized by poor energy-accumulating properties and are not used for the production of electrodes for energy-storage devices.

Polymer metal complexes based on the substituted tetradentate Schiff's bases, including poly-[Me(R-Salen)] (where Me—a transition metal having at least two different degrees of oxidation—e.g. Ni, Pd; Co, Cu, Fe; Salen—a residue of bis-(salicylaldehyde)-ethylenediamine in Schiff's base, R—electron-donating substituent—e.g. radicals $CH_3O$—, $C_2H_5O$—, HO—, —$CH_3$ and others), are known [Timonov A. M., Shagisultanova G. A., Popeko I. E. Polymeric Partially-Oxidized Complexes of Nickel, Palladium and Platinum with Schiff Bases//Workshop on Platinum Chemistry. Fundamental and Applied Aspects. Italy, Ferrara, 1991. P. 28]. The above-named polymer complexes were produced via the electrochemical oxidation of square-planar monomers [Me(R-Salen)], and the stack structure of a polymer was confirmed through the use of spectral methods.

Known (from publications) studies of metal complexes poly-[Me(R-Salen)] and electrodes chemically modified by these metal complexes conducted by the inventors of the present invention and other researchers were of theoretical nature. They were directed at the identification of structure and electrochemical behavior of these polymers. Exclusively analytical chemistry and optics were considered as a fields of potential application of these polymers, such as in U.S. Pat. Nos. 6,323,309, 5,543,326, and 5,840,443.

Moreover, many researchers working in this field believe that poly-[Me(R-Salen)] are formed due to the covalent bonds between the phenyl nuclei of monomers, and not due to the formation of the stack structures-[P. Audebert, P. Capdevielle, M. Maumy. Redox and Conducting Polymers based on Salen-Type Metal Units; Electrochemical Study and Some Characteristics//New J. Chem. 1992. V. 16. P. 697], which, in turn, according to their opinion, makes it impossible to use poly-[Me(R-Salen)] as an energy-accumulating substance in energy-storage devices.

However, that negative attitude toward the redox polymers (as an energy-accumulating layer) is more likely caused by specific features of the formation of the redox polymer layer on a conducting substrate and, at the end, by the structure of the formed layer (rather than by electrochemical properties of the redox polymer itself). Conventional methods of electropolymerization (which imply the supply of a constant voltage to a substrate) don't allow to produce the electrodes offering a high specific energy capacity. As the inventors believe, this is associated with the fact that, with the stack structure of the redox polymer layer being formed in the mode of continuous polymerization, defects (e.g. individual stacks—redox polymer fragments that for different reasons have stopped growing in the process of redox polymer layer formation) are produced in the layer being formed. If, for example, the process of the redox polymer layer formation is conducted on a porous substrate (which is associated with the desire to obtain a larger specific surface of the polymer layer), then continuous polymerization results in the quick overgrowth of the outer surface of the substrate with a polymer, while its inner developed surface stays uncovered with a polymer.

The engineering problem addressed by the present invention comprises the development of a method of manufacture of electrodes chemically modified by a redox polymer that offer a high specific energy capacity, making it possible to utilize these electrodes in energy-storage devices.

SUMMARY OF THE INVENTION

A method of manufacture of an electrode is implemented as follows. A conducting substrate is placed in an electrolyte that contains an organic solvent, compounds capable of dissolving in said solvent [which dissolution is accompanied by the production of electrochemically inactive (at concentrations of no less than 0.01 mol/l) ions within the range of potentials from −3.0 V to +1.5 V] and a dissolved monomer—namely, metal complex poly-[Me(R-Salen)] at a concentration from $5 \times 10^{-5}$ mole/liter to that restricted by the solubility limit (where Me—transition metal, R—electron-donating substituent, Salen—residue of bis-(salicylaldehyde)-ethylenediamine in Schiff's base). The layer of a redox polymer can be applied onto a substrate surface via electrochemical polymerization of a metal complex poly-[Me(R-Salen)], resulting from the application of a voltage between electrode substrate (that serves as an anode) and counter-electrode (that serves as a cathode) submerged into the electrolyte.

A material that offers a high value of the specific surface parameter that is characterized by good electronic conduction and that is electrochemically inactive within the range of potentials from −3.0 to +1.5 V (the potentials are given in comparison to a chlorine-silver electrode) can be used as a conducting substrate of the electrode. For example, it is possible to use the carbon fiber and other carbon materials offering a high value of a specific surface parameter, carbon materials with metal coatings, and metal electrodes offering a high value of a specific surface parameter. Besides, polymers (offering an electronic conduction property) in the form of films, porous structures, foams and so forth can be used as a conducting substrate.

Acetonitrile, dimethyl ketone, or propylene carbonate can be used as said organic solvent that enters into the composition of the electrolyte.

Salts of tetrabutyl ammonium, tetraethyl ammonium, and tetramethyl ammonium—perchlorates, tetrafluotoborates, hexafluoro phosphates—can be used as said compounds that enter into the composition of the electrolyte.

A metal from the group Ni, Pd, Co, Cu, Fe is used as a transition metal Me in the said metal complex.

$CH_3O—$, $C_2H_5O—$, $HO—$, $—CH_3$ are used as said electron-donating substituents R that enter into the composition of the metal complex.

A layer of a redox polymer is applied when the potential on said substrate is within the range from 0.85 V to 1.3 V (as comparised to a chlorine-silver electrode placed in the electrolyte). At that, a specific value of the potential shouldn't be higher than the potential of nonreversible oxidation of the redox polymer used—for example, 0.85 V for complex [Pd($CH_3O$-Salen)] or 1.3 V for complex [Ni(Cl-Salen)].

Application of a layer of a redox polymer may be carried out by the simultaneous circulation of the electrolyte, which would allow to improve the quality of an electrode being produced.

The distinctive feature of the electrode-manufacturing method encompasses the pulse mode of supplying the voltage between the substrate and counter-electrode. The duration of a voltage pulse may be from 1 s to 30 min with the pulse ratio being up to 3600. The pulse ratio means the relationship of the period of pulse repetition and the pulse duration. This relationship allows to optimize the mode of formation of the redox polymer layer and produce the electrodes offering an increased specific energy capacity.

BRIEF DESCRIPTION OF THE DRAWINGS

The invention is illustrated by the following graphic materials and drawings.

FIG. 3-a illustrates the diffusion of the metal complex molecules into the depth of a formed redox polymer layer during the pause between the voltage pulses.

FIG. 3-b illustrates the growth of a redox polymer layer during the application of a voltage pulse to the substrate.

DETAILED DESCRIPTION OF THE INVENTION

Figure 1:
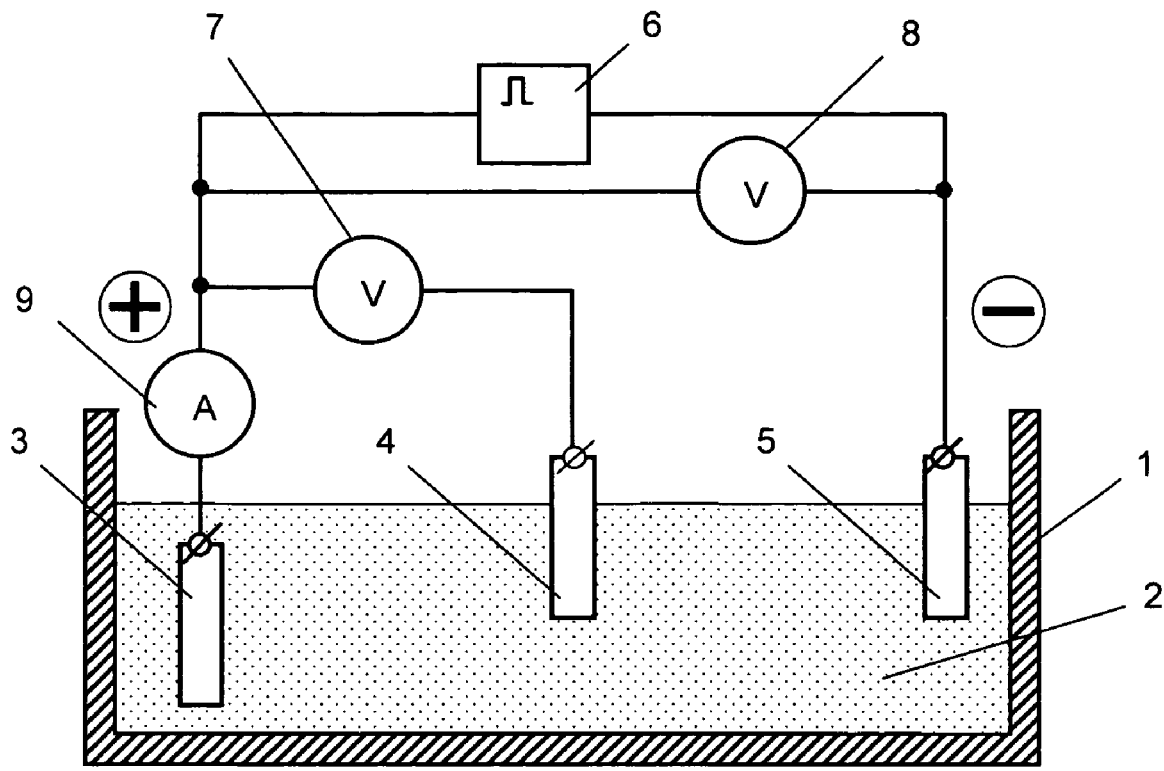
FIG. 1 is a schematic diagram of an apparatus for electrode-manufacturing.

A block diagram of an apparatus used for applying a redox polymer layer onto a substrate of an electrode in accordance with the method of the present invention is shown in FIG. 1. The apparatus comprises a reservoir 1, which is filled with an electrolyte 2 into which a conducting substrate 3, a comparison electrode 4 (e.g. chlorine-silver electrode), and a counter electrode 5 are submerged. Substrate 3 is electrically connected to the positive pole of a voltage source 6, while counter electrode 5 is connected to its negative pole. The instrumentation for measuring and monitoring the voltage between substrate 3 and counter electrode 5 (a voltmeter 7), the voltage between substrate 3 and comparison electrode 4 (a voltmeter 8) and the intensity of the current flowing in the circuit of substrate 3 (an amperemeter 9) are connected according to the scheme shown in FIG. 1.

Electrolyte 2 can be prepared from organic solvents such as the acetonitrile, dimethyl ketone, or propylene carbonate type. To prepare electrolyte 2, one should add certain substances to the above-referenced solvents. Such substances should be capable of dissolving in said solvents with the resulting concentration of no less than 0.01 mol/l and dissociating with the formation of electrochemically inactive (within the range of potentials from −3.0 V to +1.5 V) ions. Among such substances are, for example, salts of tetrabutyl ammonium, tetraethyl ammonium, tetramethyl ammonium—perchlorates, tetrafluotoborates, hexafluoro phosphates and other substances meeting the above-indicated requirements. Besides a solvent and electrochemically inactive ions, the electrolyte contains dissolved metal complex [Me(R-Salen)], which is later used to form a redox polymer layer on electrode substrate 3. The concentration of the dissolved metal complex can be from $5 \times 10^{-5}$ mole/liter and higher—up to a value restricted by the solubility limit of a metal complex in a solvent used on the process.

The formation of a redox polymer layer on electrode substrate 3 takes place under the following conditions: voltage is applied from source 6 to in-between substrate 3 and counter electrode 5. In this process, the molecules of metal complex [Me(R-Salen)] located in electrolyte 2 are oxidized on the surface of conducting substrate 3, thus forming a redox polymer layer. This process is continued until the formation of a redox polymer layer of a required thickness is completed.

The electrode manufactured in accordance with the above-described manner (after several auxiliary technological steps—e.g. washing and drying) can then be used in the design of an energy-storage device (e.g. a capacitor).

A conducting substrate and said electrolyte with metal complex [Me(R-Salen)] represent the source materials for the electrode manufacture. These materials can be provided by any known appropriate method.

Figure 2:
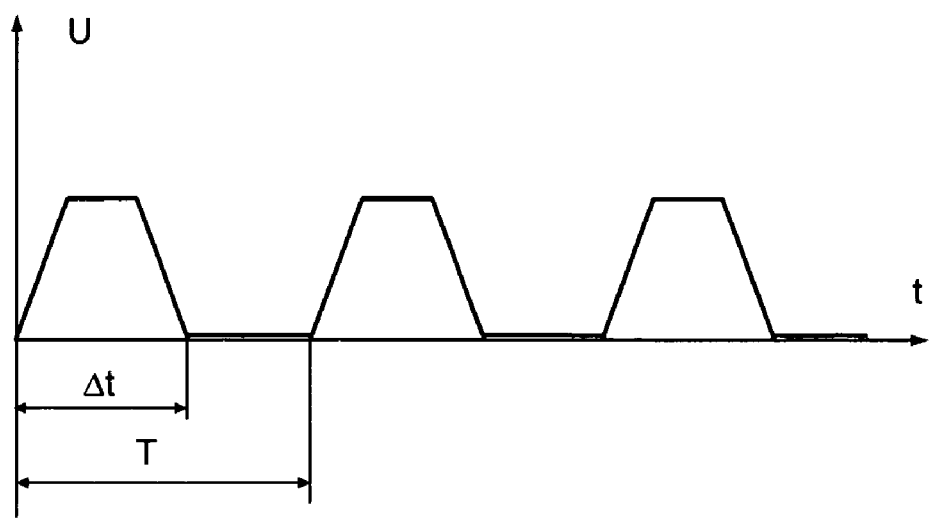
FIG. 2 is a time diagram that illustrates the pulse mode of the voltage supplied to the substrate to form a polymer layer on said substrate.

An electrode having a higher specific energy capacity is produced in the case when in the course of a redox polymer layer formation voltage U is supplied between substrate 3 and counter electrode 5 in a pulse mode during a certain period of time $\Delta t$ with a periodicity T (see FIG. 2).

FIGS. 3(a)-(b) illustrate the formation of a redox polymer layer under the conditions of a pulse mode of voltage supply. FIGS. 3(a)-(b) show electrode 11 (which is being manufactured) comprising substrate 12 with redox polymer layer 13 being formed on said substrate (this layer is shown as fragments 14 of the redox polymer with anions 15 (joined to these fragments) of the salt of electrolyte 16, into which substrate 12 is placed). Besides, anions 17 and cations 18 of the salt of electrolyte, as well as metal complex molecules 19 (that constitute said electrolyte), are also shown in FIGS. 3(a)-(b).

Diffusion of metal complex molecules 19 into the depth of redox polymer layer 13 being formed takes place during the breaks between the voltage pulses (see FIG. 3(a)). In addition to further growth of the thickness of layer 13, the voltage applied after such breaks provides for the correction of defects inside the volume of already formed layer 13 (see FIG. 3(b)). Such defects are, for example, individual stacks— i.e. fragments of a redox polymer, which stopped growing during the formation of the redox polymer layer for various reasons. The defects are corrected because metal complex molecules 19 have enough time to diffuse to a location where a defect is located during the breaks between the voltage pulses, and once they reach such a location, they get oxidized there.

Besides, when using porous or fibrous materials as conducting substrate 12 of an electrode, the metal complex molecules diffuse into the depth of the substrate material during the breaks between the voltage pulses.

Though the use of the pulse mode of voltage application increases the total time needed to form a redox polymer layer, it makes it possible to make the electrodes with a redox polymer layer that offer an increased specific energy capacity. Selection of the optimal mode for the formation of the redox polymer layer depends upon a number of factors. Therefore, depending on a conducting substrate material used, the structure of a conducting substrate of an electrode, a metal complex, a composition and concentration of electrolyte, temperature, the electrolyte circulation parameters and required thickness of redox polymer layer to be formed, the value of voltage supplied, a pulse shape, a pulse duration and a time interval between pulses (voltage pulse ratio) can be different.

Selection of pulse ratio for the pulses of voltage supplied to a substrate (i.e. the ratio of the pulse repetition period to pulse duration) depends on the following factors:

the required thickness of a redox polymer layer being formed on the substrate (the pulse ratio should be increased in order to produce a thicker redox polymer layer);

the porosity of a conducting layer (the pulse ratio is increased as the diameter of pores decreases);

the concentration of a monomer in the electrolyte—the pulse ratio is increased as the concentration decreases;

the potential of the substrate at which the formation of polymer layer is carried out—the pulse ratio is increased as the potential increases;

use of electrolyte circulation in the process of polymer layer formation—pulse ratio is increased as the efficiency of electrolyte circulation decreases;

the electrolyte temperature—pulse ratio is increased as the temperature decreases.

Thus, the pulse mode of voltage application turns out to be useful for the manufacture of the electrodes offering a high specific energy capacity for the case of: production of a thick layer of a redox polymer, low porosity of the substrate, low concentration of a monomer in the electrolyte, high value of potential on the substrate, absence of circulation and low temperature of the electrolyte.

Duration of the pulses may vary within the range from 1 s to 30 min. The duration of time intervals between the pulses may vary within the range from 10 s to 60 min.

Moreover, all of the above-indicated parameters of the pulsed voltage can vary according to any trend for the optimization of the process of redox polymer layer application. For instance, time intervals between the voltage pulses in the beginning of the process of the redox polymer layer formation may be shorter than those at the end of this process, while the duration of the voltage pulses will be shorter at the end of the process and longer in the beginning of the process. The supplied voltage can vary in such a way that the potential on the substrate changes according to a certain program—for example, according to the linear trend within the range from 0 to 1.3 V for complex [Ni(Cl-Salen)]; at that, the rate of the variation of a potential can vary within the range from 0.005 to 1 V/s. In general, selection of the parameters depends upon the required energy-accumulating characteristics of the redox polymer layer on the substrate.

An electrode manufactured according to the described method can be used in energy-storage devices (for example, in an electrochemical capacitor).

Usually, an electrochemical capacitor comprises a hermetically sealed casing filled with an electrolyte, with positive and negative electrodes located inside said casing. Depending on the specific design features of the capacitor, the electrodes may be separated by a porous separator—for example, by a microporous polypropylene film.

An electrolyte for the capacitor can be prepared based on organic solvents of the acetonitrile, dimethyl ketone, or propylene carbonate type. To prepare an electrolyte for the capacitor, one should add certain substances to the solvents indicated above. Such substances should be capable of dissolving in said solvents with the resulting concentration of no less than 0.01 mol/l and dissociating with the formation of electrochemically inactive (within the range of potentials from −3.0 V to +1.5 V) ions, the diameter of which is no greater than 0.6 nm. Among such substances are, for example, the salts of tetraethyl ammonium, tetramethyl ammonium—perchlorates, tetrafluotoborates, hexafluoro phosphates and other substances satisfying the above-indicated requirements.

Illustrative examples of the implementation of the method of manufacturing an electrode are the following:

EXAMPLE 1

A disk with a surface area of 38.5 $cm^2$ (manufactured from the commercially available crucible graphite glass) was used as a conducting substrate for an electrode.

Complex [Ni(Salen)] was used as a metal complex that forms a redox polymer. This complex was synthesized in the following manner. The synthesis of a nickel complex consisted in gradual pouring of the saturated ethanol solution of ligand $SalEnH_2$ (product of Aldrich Co.) to the saturated (at a temperature of 50° C.) aqueous solution of salt of metal $(Ni(ClO_4)_2 * 6H_2O$ (product of Aldrich Co.)). The resulting mixture was continuously stirred during this process at a room temperature until the crystals precipitated from the resulting solution. Then the formed precipitates were filtered under the vacuum.

A redox polymer layer on the substrate surface was produced by the method of electrochemical polymerization under the conditions of potentiostatic polarization (application of a constant potential) with a potential on the substrate being 1.0 V (with respect to a chlorine-silver comparison electrode) for a period of 21 min in an acetonitrile solution that contained $10^{-3}$ mol/l of complex [Ni(Salen)] and 0.1 mol/l of tetrafluoroborate of tetrabutyl ammonium. The voltage was supplied in the pulse mode: a three-minute period of applied voltage (polarization) followed by three-minute break. The thickness of a polymer layer was equal to 0.2 μm.

Tests were conducted after the electrode was manufactured. The charging and discharging of the electrode was conducted in an acetonitrile solution that contained the base electrolyte (0.1 mol/l of tetrafluoroborate of tetrabutyl ammonium). The charging mode was as follows: the galvano-static, current density was equal to 30 μA/$cm^2$; with the potential of electrode being monitored concurrently. The charging process was stopped when the value of the electrode potential reached 1.2 V.

Figure 4:
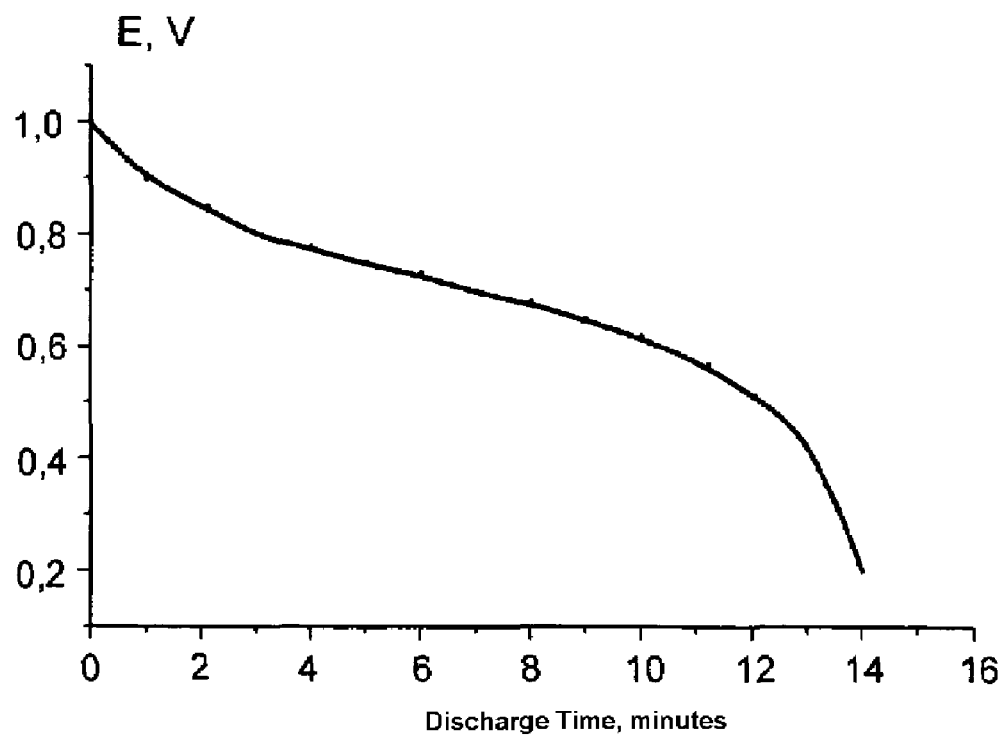
FIG. 4 is a discharge curve for an electrode manufactured in accordance with described example 1.

Discharging of the electrode was conducted in the galvanostatic mode, with the current density being equal to 10 $\mu A/cm^2$; with potential E of the electrode being monitored concurrently. The discharge curve for the electrode is shown in FIG. 4.

The value of the specific energy stored (calculated from the data in FIG. 4) is equal to 290 J/g of the polymer.

EXAMPLE 2

Figure 5:
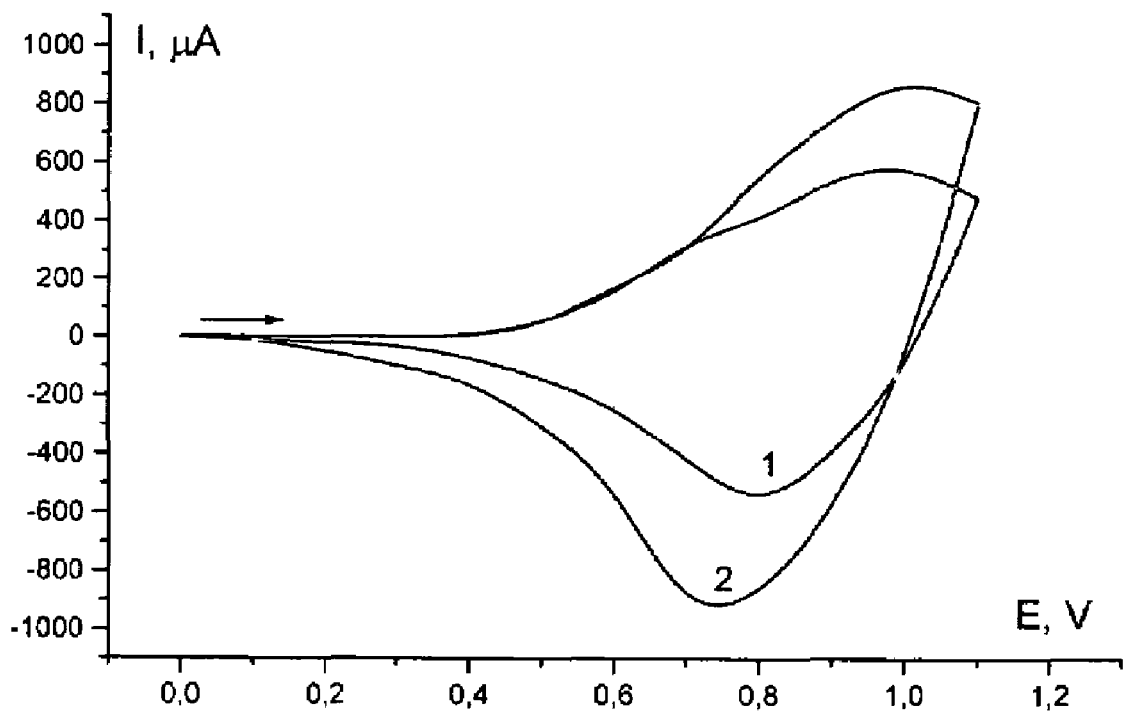
FIG. 5 is a graph of the chrono-volt-ampere-grams of the charge—discharge processes (i.e. oxidation—reduction processes) of a polymer poly-[Ni($CH_3O$-SalEn)] layer for the electrodes manufactured in accordance with described example 2.

To compare the parameters of an electrode produced in the constant voltage mode with those of an electrode produced in the pulse voltage mode, two electrodes were manufactured on a platinum substrate with an area of 0.3 $cm^2$. At that, the formation of the redox polymer layer on both substrates was conducted in similar electrolytes that included an acetonitrile solution of the source complex [Ni($CH_3$O-Salen)] and 0.1 mol/l of tetrafluoroborate of tetrabutyl ammonium for one and the same effective period of time (10 minutes), but in the first case—in the constant voltage mode at a potential of 1.0 V, and in the second case—in the pulse voltage mode with the parameters being as follows: (5 polarization intervals—each of them lasted for 2 minutes—and breaks that lasted for 5 minutes). Then the electrodes were placed into a supporting solution (0.1 mol/l of tetrafluoroborate of tetrabutyl ammonium) and the chrono-volt-ampere-grams were recorded to determine the amount of electricity corresponding to the polymer oxidation and reduction processes. The chrono-volt-ampere-grams of the charging—discharging processes (oxidation—reduction) of polymer complex poly-[Ni($CH_3$O-SalEn)] in the above-indicated solution (0.1 mol/l of perchlorate of tetrabutyl ammonium in acetonitrile), with the rate of scanning of potentials being equal to 50 mV/s, are shown in FIG. 5, where I—is the charging—discharging current, E—the potential of the electrode. The above-indicated characteristics of the electrode produced in the continuous polarization mode (curve 1) and electrode produced in the pulsed polarization mode (curve 2) are shown in FIG. 5.

The observed increase in the chrono-volt-ampere-gram maximums in the case of the electrodes produced in the pulsed polarization mode points to the fact of 50% increase in the amount of electricity corresponding to the polymer oxidation and reduction processes.

What is claimed is:

1. A method of manufacturing an electrode for use in an energy-storage device, the method comprising:
   applying a voltage in a pulse mode between a conducting substrate serving as an anode and a counter electrode serving as a cathode, wherein both the conducting substrate and the counter electrode are submerged into an electrolyte comprising no less than $5 \times 10^{-5}$ mol/L of a metal complex [Me(R-Salen)] in an organic solvent and compounds capable of dissolving in the organic solvent and producing electrochemically inactive ions at concentrations of no less than 0.01 mol/L within a potential range from about −3.0 V to about +1.5 V, wherein:
      Me is a transition metal having at least two different degrees of oxidation,
      R is an electron-donating substituent, and
      Salen is a residue of bis-(salicylaldehyde)-ethylenediamine, to form on the conducting substrate an energy-accumulating layer comprising a redox polymer {poly-[Me(R-Salen)]}, wherein:
      the pulse mode comprises a plurality of breaks of 0V between pulses of the voltage applied, wherein the duration of the breaks is selected to allow the metal complex to diffuse into the redox polymer, and
      the conducting substrate comprising the energy-accumulating layer provides an electrode having a specific energy capacity suitable for use in an energy-storage device.

2. The method of claim 1, wherein each voltage pulse is applied for a duration from about 1 second to about 30 minutes with a pulse ratio of up to 3600.

3. The method of claim 1, wherein the conducting substrate is a conductive material that is electrochemically inactive within the potential range from about −3.0 V to about +1.5 V.

4. The method of claim 3, wherein the conducting substrate is a carbon material.

5. The method of claim 3, wherein the conducting substrate is a carbon material with a metal coating.

6. The method of claim 3, wherein the conducting substrate is a metal.

7. The method of claim 3, wherein the conducting substrate is an electrically conductive polymer in the form of a film, a porous structure, or a solid foam.

8. The method of claim 1, wherein the organic solvent comprises acetonitrile, dimethyl ketone, or propylene carbonate.

9. The method of claim 1, wherein the compounds are salts comprising a cation selected from tetrabutyl ammonium, tetraethyl ammonium, and tetramethyl ammonium, and an anion selected from perchlorates, tetrafluoroborates, and hexafluorophosphates.

10. The method of claim 1, wherein the transition metal Me is selected from the group consisting of Ni, Pd, Co, Cu, Fe and combinations thereof.

11. The method of claim 1, wherein the electron-donating substituent R is selected from —$OCH_3$, —$OC_2H_5$, —OH, and —$CH_3$.

12. The method of claim 1, wherein the energy-accumulating layer is formed at a substrate potential no higher than the potential of nonreversible oxidation of the redox polymer.

13. The method of claim 1, further comprising circulating the electrolyte while the energy-accumulating layer is being formed.

14. A method of manufacturing an electrode for use in an energy-storage device, the method comprising:
   applying an electrical potential in a pulse mode between an electrode and a counter electrode in an electrolyte comprising one or more salts and a metal complex [Me(R-Salen)] in a solvent, wherein:
      Me is a transition metal having at least two different degrees of oxidation,
      R is an electron-donating substituent, and
      Salen is a residue of bis-(salicylaldehyde)-ethylenediamine;
   wherein the pulse mode comprises breaks of 0V between pulses of the electrical potential, the pulses of the electrical potential being adapted to form a redox polymer layer on the electrode, the redox polymer layer comprising {poly-[Me(R-Salen)]}, and the breaks of 0V comprising a time interval adapted to allow the metal complex to diffuse into the redox polymer layer, and
   wherein the redox polymer layer so formed on the electrode has a specific energy of at least about 290 J/g.

15. The method of claim 14, wherein Me is selected from Ni, Pd, Co, Cu, Fe and combinations thereof, and R is selected from —$OCH_3$, —$OC_2H_5$, —OH, and —$CH_3$.

16. The method of claim 14, wherein the one or more salts comprise cations selected from tetrabutyl ammonium, tetraethyl ammonium, and tetramethyl ammonium, and anions selected from perchlorates, tetrafluoroborates, and hexafluorophosphates.

17. The method of claim 14, comprising circulating the electrolyte while applying the electrical potential in a pulse mode.

18. The method of claim 14, wherein the electrical potential is in the range of about +0.85V and about +1.3V versus a silver-chloride electrode.

19. The method of claim 14, wherein each pulse of the electrical potential is applied for a duration between about 1 second to about 30 minutes.

20. The method of claim 14, wherein the pulse mode comprises a pulse ratio of up to 3600.

* * * * *